United States Patent
Demazeau et al.

(10) Patent No.: US 9,722,371 B2
(45) Date of Patent: *Aug. 1, 2017

(54) SOCKET FOR VEHICLE PASSENGER COMPARTMENT

(71) Applicant: Valeo Vision, Bobigny (FR)

(72) Inventors: Jean-Yves Demazeau, Aussillon (FR); Benoit Descazeaux, Castres (FR); Sylvain Fournier, Villecomtal (FR); Matthieu Bernable, Castres (FR)

(73) Assignee: Valeo Vision, Bobigny (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/053,107

(22) Filed: Feb. 25, 2016

(65) Prior Publication Data

US 2016/0254626 A1 Sep. 1, 2016

(30) Foreign Application Priority Data

Feb. 26, 2015 (FR) ..................... 15 51658

(51) Int. Cl.
| | | |
|---|---|---|
| *H01R 24/04* | (2006.01) | |
| *H01R 24/70* | (2011.01) | |
| *B60N 3/14* | (2006.01) | |
| *H01R 4/06* | (2006.01) | |
| *H01R 43/20* | (2006.01) | |
| *H01R 4/18* | (2006.01) | |
| *H01R 43/048* | (2006.01) | |
| *H01R 24/58* | (2011.01) | |
| *H01R 13/74* | (2006.01) | |
| *H01R 103/00* | (2006.01) | |
| *H01R 13/20* | (2006.01) | |
| *H01R 13/652* | (2006.01) | |

(52) U.S. Cl.
CPC ............... *H01R 24/70* (2013.01); *B60N 3/14* (2013.01); *H01R 4/06* (2013.01); *H01R 4/18* (2013.01); *H01R 4/188* (2013.01); *H01R 43/048* (2013.01); *H01R 43/20* (2013.01); *H01R 13/20* (2013.01); *H01R 13/652* (2013.01); *H01R 13/743* (2013.01); *H01R 24/58* (2013.01); *H01R 2103/00* (2013.01); *H01R 2201/26* (2013.01)

(58) Field of Classification Search
USPC .......................................... 439/668
See application file for complete search history.

(56) References Cited

U.S. PATENT DOCUMENTS

| | | | |
|---|---|---|---|
| 4,713,017 A | * | 12/1987 | Pesapane ............. H01R 13/447 439/142 |
| 5,403,996 A | | 4/1995 | Mattis et al. |
| 5,780,813 A | * | 7/1998 | Sire .......................... B60N 3/14 219/265 |
| 5,796,073 A | | 8/1998 | Mattis et al. |

(Continued)

FOREIGN PATENT DOCUMENTS

| | | |
|---|---|---|
| DE | 4436794 A1 | 4/1996 |
| GB | 2089012 A | 6/1982 |
| GB | 2318407 A | 4/1998 |

*Primary Examiner* — Tho D Ta

(74) *Attorney, Agent, or Firm* — Jacox, Meckstroth & Jenkins

(57) ABSTRACT

A socket for a vehicle passenger compartment comprising a socket body and at least one electrical connection element fixed to the socket body by clinching. The socket is adapted for use on multiple vehicles of different manufacturers.

18 Claims, 7 Drawing Sheets

(56) References Cited

U.S. PATENT DOCUMENTS

| | | | | |
|---|---|---|---|---|
| 5,928,539 A * | 7/1999 | Thivet | ............ | B60N 3/14 |
| | | | | 219/265 |
| 6,130,409 A * | 10/2000 | Batut | ............ | B60N 3/14 |
| | | | | 219/265 |
| 6,619,983 B2 * | 9/2003 | Ota | ............ | H01R 24/58 |
| | | | | 439/521 |
| 7,063,447 B2 * | 6/2006 | Andrieu | ............ | B60Q 3/275 |
| | | | | 362/253 |
| 7,377,021 B2 * | 5/2008 | Mauermann | ............ | B21J 15/025 |
| | | | | 29/521 |
| 8,215,999 B2 * | 7/2012 | Lau | ............ | H01R 13/743 |
| | | | | 439/668 |
| 8,555,479 B2 * | 10/2013 | Trojer | ............ | B21D 39/031 |
| | | | | 29/243.5 |
| 9,102,357 B2 * | 8/2015 | Watanabe | ............ | B62D 25/02 |
| 2010/0213797 A1 * | 8/2010 | Stoeckl | ............ | B21D 39/031 |
| | | | | 310/418 |
| 2016/0197428 A1 * | 7/2016 | Demazeau | ............ | H01R 13/40 |
| | | | | 439/733.1 |

* cited by examiner

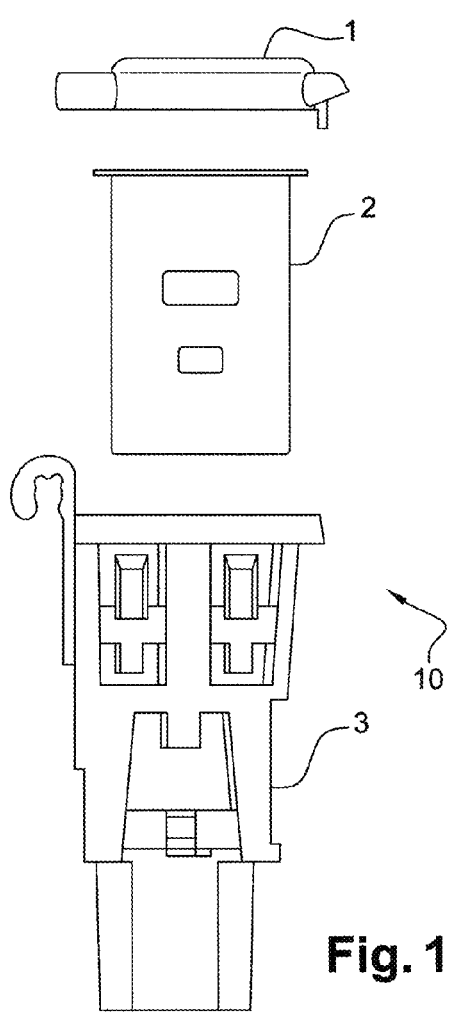
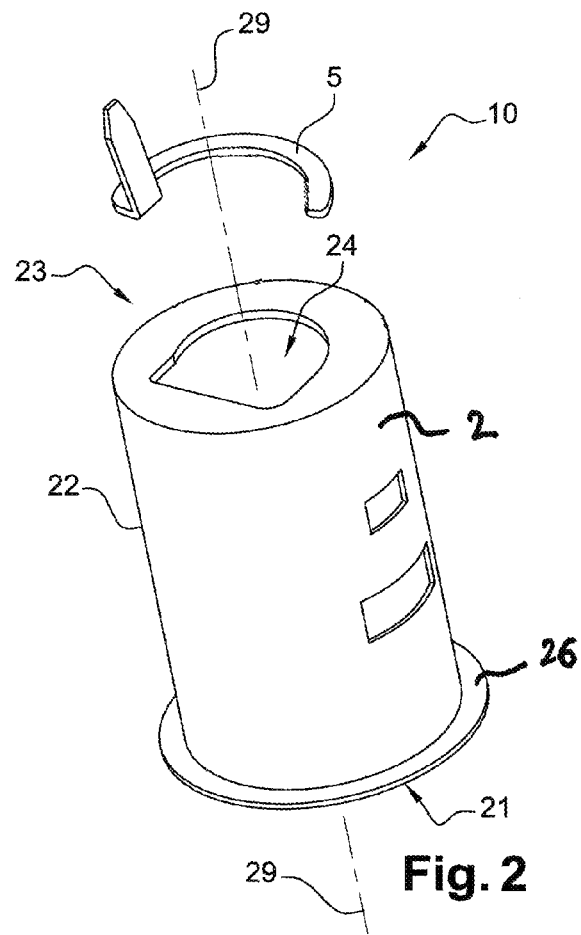
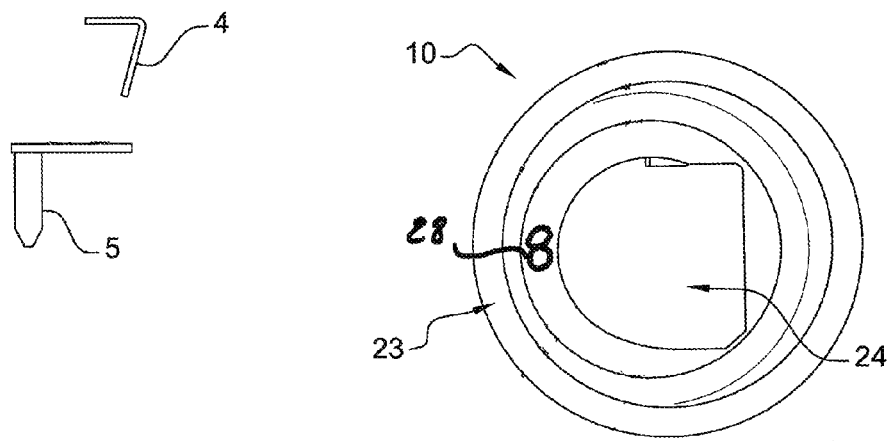
Fig. 1
Fig. 2
Fig. 3

SOCKET FOR VEHICLE PASSENGER COMPARTMENT

CROSS-REFERENCE TO RELATED APPLICATIONS

This application claims priority to the French application 1551658 filed Feb. 26, 2015, which application is incorporated herein by reference and made a part hereof.

BACKGROUND OF THE INVENTION

1. Field of the Invention

The invention concerns sockets for vehicle passenger compartments.

These so-called "12 volt" sockets, although they also accommodate voltages of 24 V, enable connection of electrical devices such as GPS devices, baby bottle heaters, electrical converters or chargers, etc.

2. Description of the Related Art

There is known for this purpose a product of the applicant. This socket, situated at the level of or under the dashboard of the vehicle, comprises four components: a cap, a holding body comprising a so-called "negative" connection tongue, a ring with an integrated connection body and a so-called "positive" electrical connection tongue. On opening the cap, the user can plug in one of their electrical devices.

The disadvantage of this product is that it is compatible only with vehicles manufactured by a limited number of motor vehicle manufacturers. Thus the socket body of the product is designed to accept only the appropriate negative electrical connection tongue.

A parallel product intended for another motor vehicle manufacturer comprises nine components, but those of these components that are similar to those of the first socket have different dimensions. The product matches the dimensions of the dashboard, its interior layout and the manufacturer's design. At nine, the number of components is relatively high, which generates costs, notably for the manufacture and inventory management of all these parts. Likewise, the socket body for the vehicles of this manufacturer is designed to accept only the negative electrical connection tongue designed for those vehicles. The same disadvantage applies to other manufacturers supplied with vehicle passenger compartment sockets by the applicant.

The same situation may arise for other suppliers of sockets for vehicles, who must then produce a plurality of different products for the various manufacturers, although the components of those products are similar.

SUMMARY OF THE INVENTION

An object of the invention is to propose a product that can be adapted to a plurality of types of manufacturers.

To this end there is provided an assembly for producing a socket for a vehicle passenger compartment, the assembly comprising:

a socket body; and
at least one electrical connection element fixed to the socket body by clinching.

The socket body is therefore compatible with a plurality of different electrical connection elements, for example so-called negative connection tongues, and it is no longer obligatory to design a socket body for each different socket type corresponding to a different motor vehicle manufacturer. This also enables the socket to be manufactured from a relatively small number of parts, for example five parts (see below).

Moreover, the fixing of the electrical connection element fixed to the socket body by clinching avoids the addition of material during fixing and makes it possible to ensure better electrical conductivity between these two parts.

Furthermore the invention possesses the following characteristics, considered in isolation or in combination:

the fixing between the socket body and the electrical connection element is designed to allow electrical contact between the socket body and the connection element;
the socket body comprises an opening emerging onto a receptacle intended to receive a connector for the electrical power supply of an electrical device;
the socket body comprises at least one plane back opposite to the opening of the receptacle;
the plane back of the socket body comprises at least one main emergent hole;
the main emergent hole is situated at the center of the plane back of the socket body;
the main emergent hole has an outline comprising at least one circular arc;
the at least one electrical connection element comprises a plane support, and a tongue projecting from the support;
the plane support is fixed to the plane back of the socket body by clinching;
the plane support borders at least in part the main emergent hole;
the socket comprises a base fixed in a predetermined position to the body;
the base is a ring;
the base has a raised pattern projecting from a back of the base so as to form an abutment in the socket upon receiving a connector;
the electrical connection element being a first electrical connection element, the socket furthermore comprises at least one second electrical connection element;
the at least one second electrical connection element has a substantially hexagonal electrical connection hole;
the first electrical connection element is fixed to the body by clinching at the level of at least one fixing point;
the first electrical connection element is fixed to the body by two fixing points, obtained by clinching;
the at least one fixing point is of circular, conical, rectangular, polygonal shape, or of hybrid shape obtained from the above shapes;
the at least one fixing point is of circular shape;
the at least one fixing point is a twin fixing point;
the socket comprises at least one cap for closing a housing of the socket;
the socket body and the at least one electrical connection element are formed of at least one electrically conducting material; and
the socket body is formed of the at least one electrically conducting material comprised of aluminum and/or copper.

The subject of the invention is also a method of manufacture of a socket for a vehicle passenger compartment comprising a socket body and an electrical connection element, the electrical connection element being fixed to the socket body according to the following steps:

placing the electrical connection element and the socket body in contact; and fixing the electrical connection element to the socket body by clinching.

Moreover the invention possesses the following characteristics, considered in isolation or in combination:
the first element is fixed to the body by at least one fixing point obtained by clinching;
the fixing point obtained by clinching is a twin point. Advantageously, this characteristic makes it possible to avoid the rotation of the electrical connection element;
the first element is fixed to the body by at least two fixing points obtained at the same time by clinching. Advantageously, this characteristic makes it possible to avoid the rotation of the electrical connection element;
the step of fixing the electrical connection element to the socket body is carried out without addition of material;
the electrical connection element is stamped in the socket body;
the stamping of the electrical connection element in the socket body creates at least one first impression in the connection element and a second impression in the socket body so that a part of an exterior wall of the first impression projects into an interior wall of the second impression;
the socket body is stamped in the electrical connection element;
the method of manufacture comprises a step of inserting the socket body into a base; and
the method of manufacture comprises a step of fixing a cap on the base.

These and other objects and advantages of the invention will be apparent from the following description, the accompanying drawings and the appended claims.

BRIEF DESCRIPTION OF THE ACCOMPANYING DRAWINGS

Other characteristics and advantages of the present invention will be more clearly apparent on reading the following description given by way of nonlimiting illustrative example with reference to the appended drawings in which:

FIG. 1 is an exploded perspective view of a socket produced using an assembly in accordance with one embodiment of the invention;

FIG. 2 is a perspective view of the body and a first electrical connection element of the socket from FIG. 1;

FIG. 3 shows the two components from FIG. 2 fixed to each other;

DETAILED DESCRIPTION OF THE PREFERRED EMBODIMENTS

Figure 4:
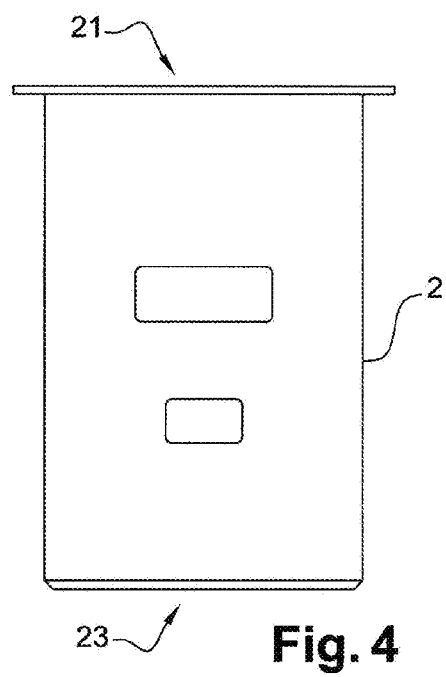
FIGS. 4 and 5 show the socket body from FIG. 2 respectively from the side and from below.

FIG. 1 shows a 12 V socket outlet or power socket 10 for a vehicle passenger compartment produced using an assembly in accordance with one embodiment of the invention.

Shown in FIG. 1 are an opening cap 1 and a socket body 2, which is the only component of this assembly that is identical in all the sockets that are described. Also shown are a base or ring 3 adapted to receive the socket body 2, a first electrical connection element 5 referred to hereinafter as the negative tongue, and a second electrical connection element 4 referred to hereinafter as the positive tongue.

Figure 5:
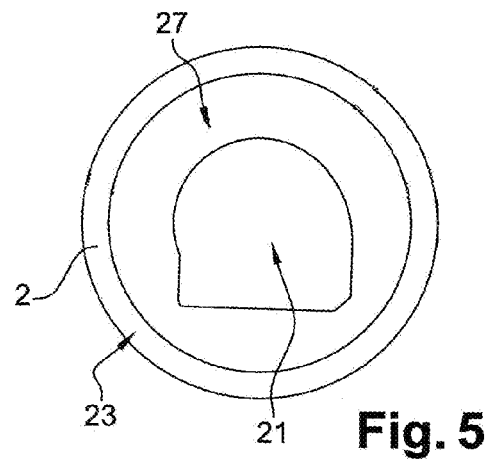

FIG. 2 shows more clearly the socket body 2 and the negative tongue 5. The socket body 2 is of tubular general shape in its main part 22, here a circular cylinder with an axis 29. One end 21 includes a circular rim or flange 26. This circular rim or flange 26 surrounds at least partially an opening 27 (shown in FIG. 5) of the socket body 2. This opening 27 emerges onto a receptacle intended to receive a connector for the electrical power supply of an electrical device. The opposite end or plane back 23 may have at the center a main emergent hole 24 formed of a semicircle contiguous with a rectangle. As a variant, the opposite end 23 may be complete.

At the level of the walls of the main part 22, the socket body 2 has two rectangular holes extending circumferentially and aligned vertically, one of which is slightly longer than the other.

The socket body 2 is therefore compatible with a plurality of negative tongues but can receive only one of them at a time.

FIG. 3 shows, as seen from below, the fastening by a twin point 28 obtained by clinching, of the negative tongue 5 into the end 23 of the socket body 2. In this configuration the twin point 28 is obtained by stamping of the socket body 2 in the negative tongue 5.

Figure 6:
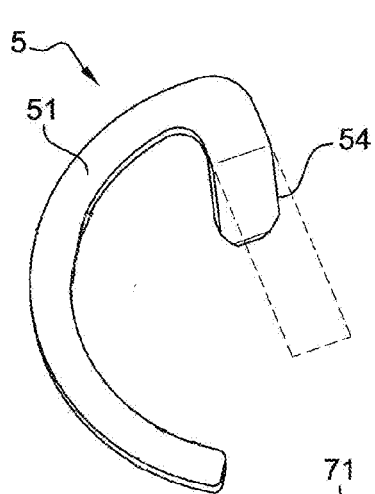
FIGS. 6, 7 and 8 are perspective views of respectively three first electrical connection elements of the assembly in accordance with this embodiment of the invention.

With reference to FIG. 6, the negative tongue or first electrical connection element 5 comprises a plane support 51 which has substantially a semicircular shape, and a projecting plane part 54, which forms the connection tongue as such. The connection tongue 54 is oriented perpendicularly to the plane support 51. The connection tongue 54 is situated in line with the semicircle formed by the plane support 51. Where the manufacture of this first electrical connection element is concerned, it is initially manufactured flat. The dashed lines moreover show the position of the connection tongue 54 when the first electrical connection element is flat. This first electrical connection element is produced by cutting a flat metal sheet, the connection tongue 54 as such is folded so as to be oriented perpendicularly to the plane support 51.

Figure 7:
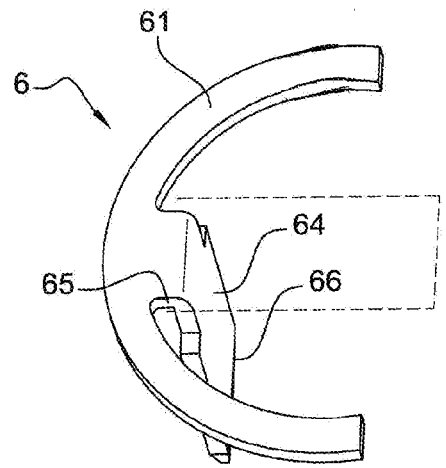
Figure 8:
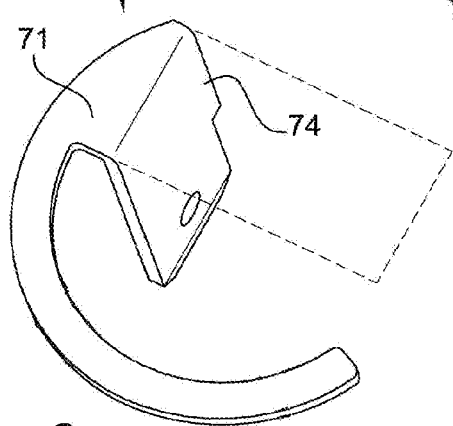

The negative tongues for first electrical connection elements (6, 7) from FIGS. 7 and 8 include the same elements but they have different dimensions and/or positions.

Accordingly, in the negative tongue 6 shown in FIG. 7, the connection tongue 64 is situated on the center of the semicircular support 61. Moreover, the connection tongue 64 has a base 65 narrower than a main part 66 that is wider than the connection tongue 54 of the first electrical connection element 5.

In FIG. 8, the connection tongue 74 as such is situated at the same location as the first electrical connection element 5 (shown in FIG. 6), i.e. in line with the semicircular support 71. The connection tongue 74 as such, i.e. the plane part, has larger dimensions in length and in width than the tongues 54 and 64 of the first two electrical connection elements (5, 6) described above.

Figure 9:
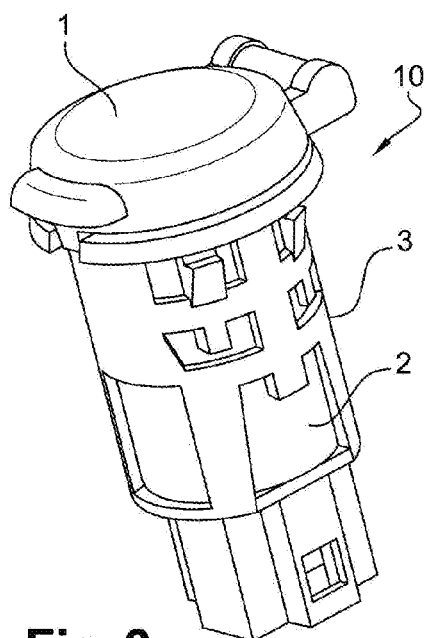
FIGS. 9 to 14 are views of different elements of the socket from FIG. 1.
Figure 10:
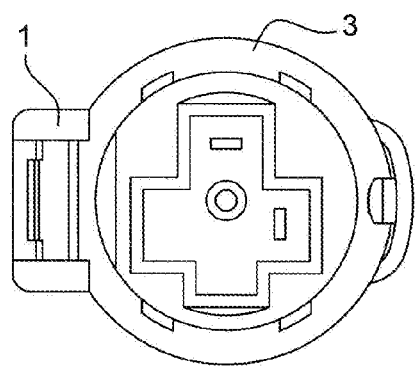

FIG. 9 shows a power socket 10 produced with the elements from FIG. 1.

Figure 11:
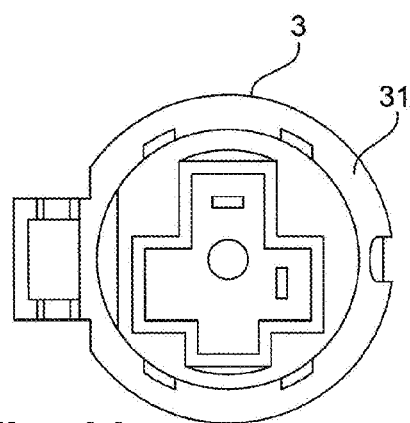

FIG. 9 shows the cap 1 that enables the power socket 10 to be opened to plug a connector into it and the socket body 2 that is received and retained in the base 3. The base 3 comprises a circular part 31, shown in FIG. 11, that is identical for the three socket bases described here, although these bases are different so as to match the corresponding three negative tongues and the corresponding three positive tongues.

Figure 12:
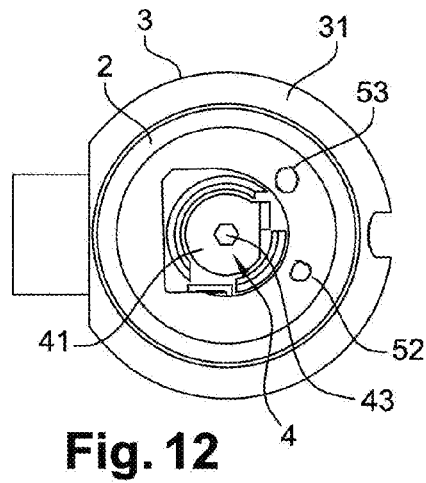

FIG. 12 is a view of the assembly in which can be seen the socket body 2 retained in the base 3, the points for fixing by clinching 52 and 53 of the negative element 5 in the socket body 2, and in the middle of the base 3, a second electrical connection element 4 having a positive tongue. The socket body 2 and the base 3 sandwich the negative tongue 5 between their backs. In this configuration the points for fixing by clinching 52 and 53 are obtained by stamping of the plane support 51 of the negative tongue 5 in the plane back 23 of the socket body 2.

Figure 27:
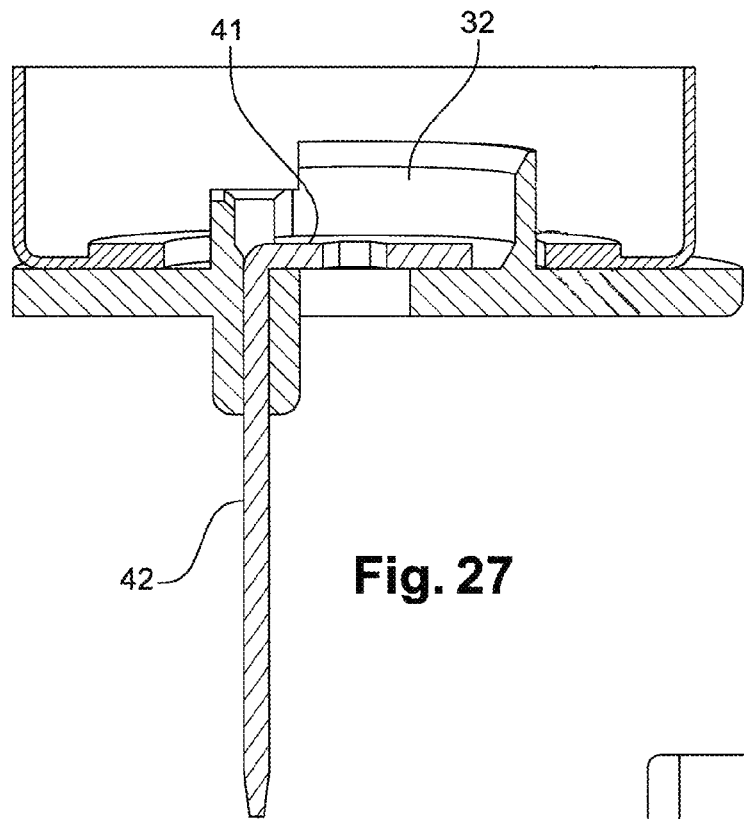
FIG. 27 is a sectional view showing the arrangement of a second connection element (positive tongue) in one of the sockets.

The arrangement of the second electrical connection element 4 with the positive tongue can also be seen in FIG. 27. It has a plane part 41 as well as a tongue 42 as such, which extends in a direction perpendicular to the plane part or support 41. The positive tongue has at its center a hexagonal hole 43 identified in FIG. 12.

Moreover as shown in FIG. 12, the base 3, disposed between the socket body 2 and the positive tongue 4, electrically insulates the positive tongue 4 relative to the socket body 2.

A raised pattern 32 on the back of the base 3, seen in FIG. 27, projects through the hole in the back of the socket body 2 and serves as an abutment when connecting a connector to this power socket 10. This circular raised pattern 32 surrounds the plane part 41 of the positive tongue 4.

Figure 30:
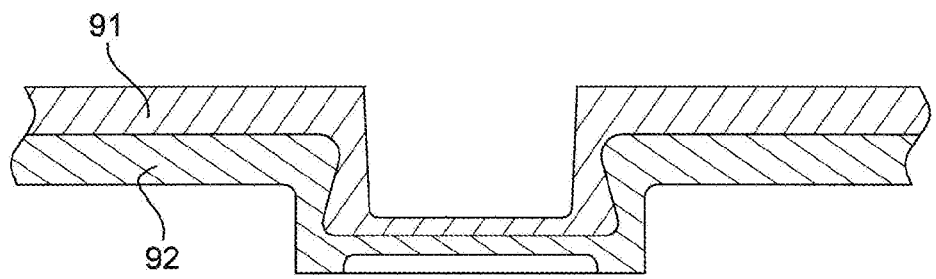
FIGS. 30 to 33 show clinching methods.
Figure 31:
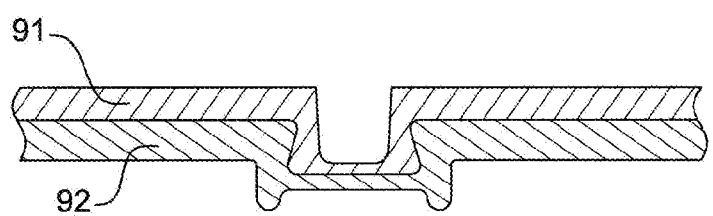
Figure 32:
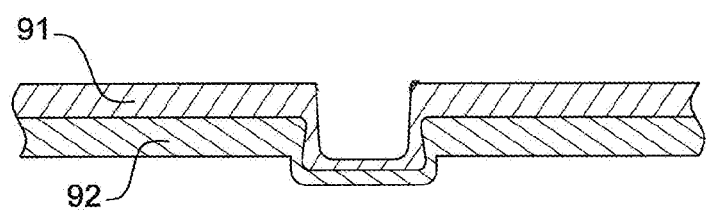
Figure 33:
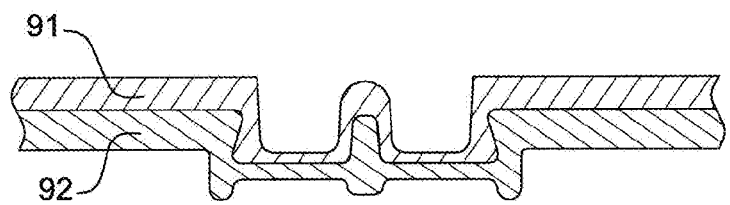

As indicated above, one of the particular features of this power socket 10 is that the negative tongue 5 is fixed to the socket body 2 by two fixing points 52 and 53 obtained by clinching. This fixing is effected by stamping of the two parts between a punch, guided by a press, and a die. The punch can stamp the socket body 2 in the negative tongue 5 or the negative tongue 5 in the socket body 2. The withdrawal of the punch leaves a cavity at the level of the fixing point. It follows from this that the parts undergo cold plastic deformation forming a connection point so that the negative tongue 5 cannot be withdrawn from the socket body 2 without damaging the socket body 2 or the negative tongue 5. This type of fixing corresponds to clinching. In this instance, the type of clinching used is "TOX-micropoint". Indeed, this method is suitable for the miniaturization of the parts since it allows assembly of the negative tongue 5 and of the socket body 2 onwards of 0.1 mm in thickness. A clinching method of "TOX-micropoint" type is shown in FIG. 30. A negative tongue 91 is impressed in a socket body 92. This is represented schematically in FIG. 31. It is also possible to stamp the socket body 92 in the negative tongue 91. Other types of clinchings are used, such as "RivetClinch TOX", represented schematically in FIG. 32. In the case of "RivetCLINCH TOX", the point retention strengths are comparable to those of a self-punching rivet, but at lower cost. Another type of clinching is "TOX-TWINpoint" or twin fixing point, represented in FIG. 33. The twin point prevents the rotation of the point and the retention strengths are about twice those of a single-point method. All these types of clinching furthermore offer excellent electrical conductivity and are performed without addition of material.

Figure 13:
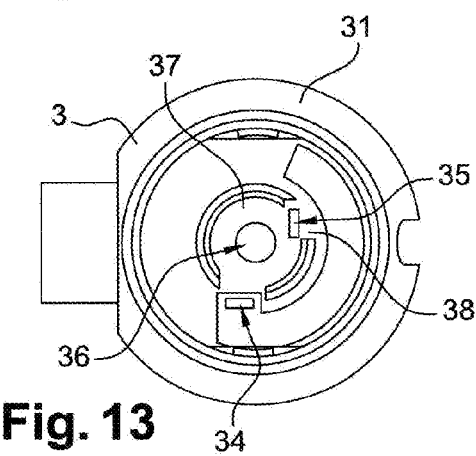
Figure 14:
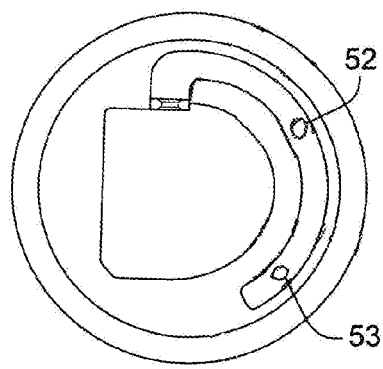
Figure 15:
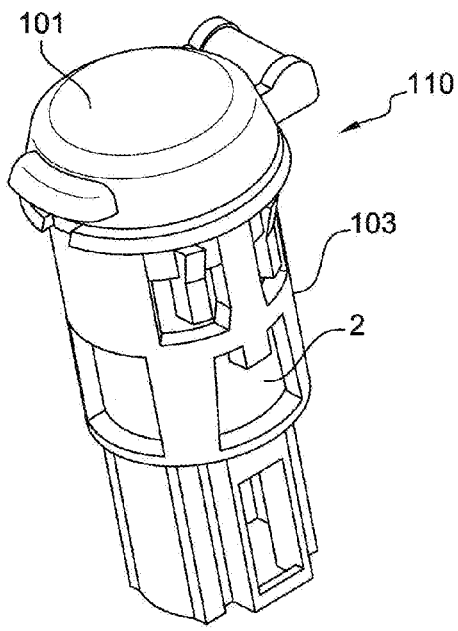
FIGS. 15 to 20 and 21 to 26 are analogous views showing two other sockets produced from this assembly.

FIG. 13 is an end view similar to that of FIG. 12, but without the socket body or the positive and negative tongues. Thus a central location 37 is intended to receive the plane support 41 of the positive tongue 4 while the contours 38 of the base 3 are adapted to retain the socket body 2 in a fixed position. The base 3 also includes two rectangular openings 34 and 35 and a central hole 36. These openings 34 and 35 allow the passage of the tongue of the electrical connection element.

FIGS. 15 to 20 show a second power socket 110 in which the socket body 2 is identical to that of the first embodiment. Likewise, the base 103 comprises a portion 31 identical to that of the first embodiment.

Figure 20:
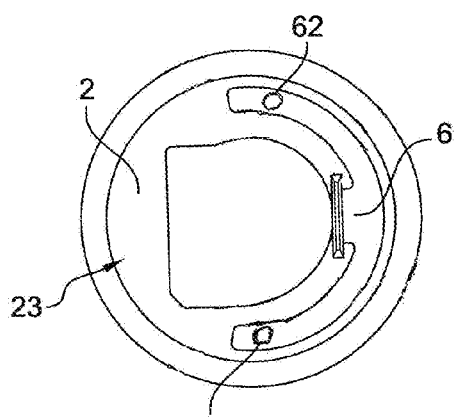

The main particular feature of this power socket 110 is that it is the negative tongue 6 that is fixed to the socket body, instead of the negative tongue 5. As FIG. 20 shows, the fixing points 62 and 63 of the negative tongue 6 are positioned on either side of the negative tongue 6 and at the ends of the plane support 61 of the negative tongue 6, the plane support 61 having a semi-circular shape. In this configuration, the points for fixing by clinching 62 and 63 are obtained by stamping of the plane support 61 of the negative tongue 6 in the plane back 23 of the socket body 2.

Figure 18:
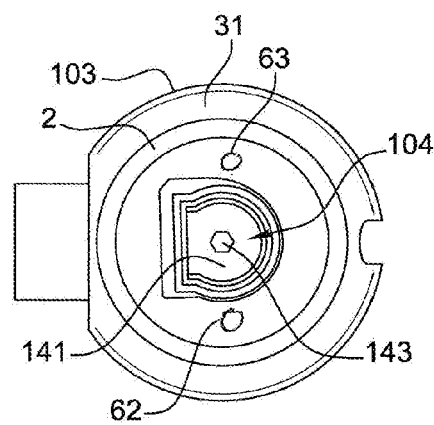

FIG. 18 is a top view of the assembly of this second power socket 110, again without the cap, which comprises a positive tongue 104 different from the tongue 4 in the first embodiment in terms of the shape of its plane support 141, and there are seen the fixing points 62 and 63 of the negative tongue 6, fixed to the socket body 2.

Figure 16:
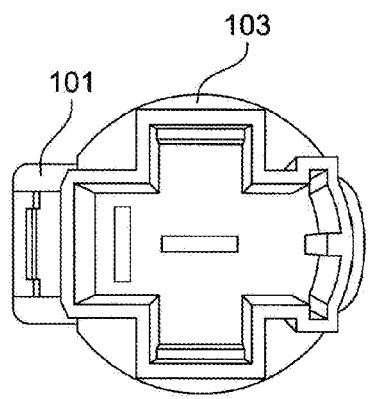
Figure 17:
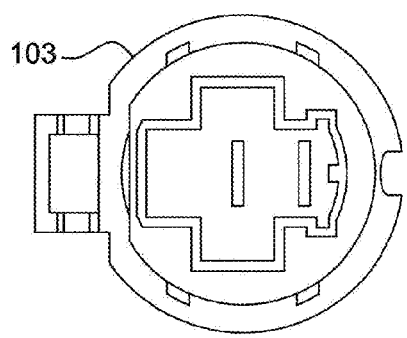
Figure 19:
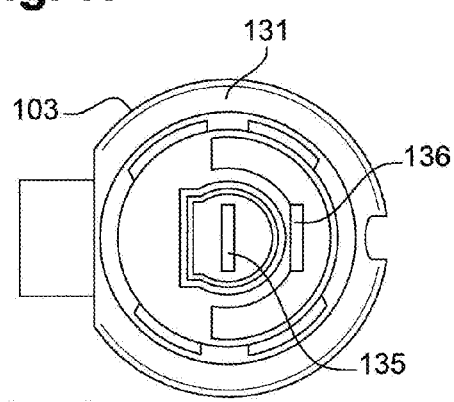

FIGS. 16, 17 and 19 are views of the base 103, which differs from the previous base 3. In particular, there is no round central hole. However, the base 103 includes two rectangular openings 135 and 136 that can be seen in FIG. 19, which this time are parallel to each other.

Figure 21:
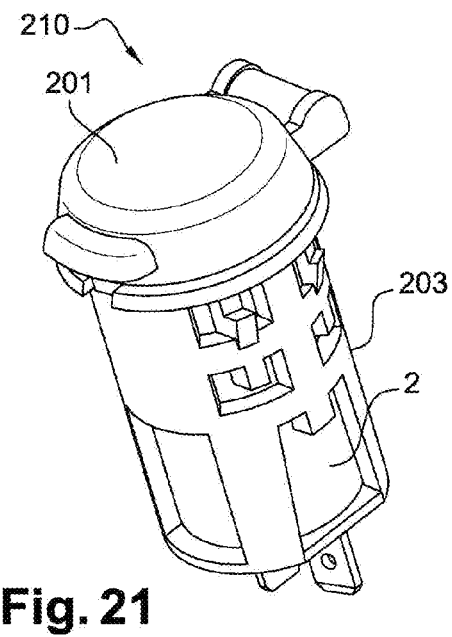
Figure 22:
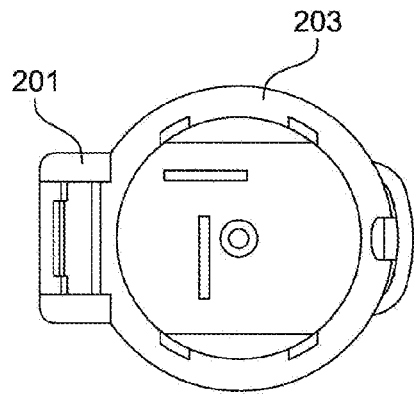
Figure 23:
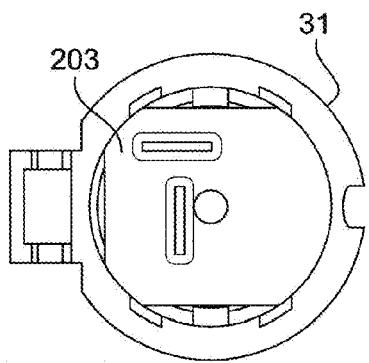
Figure 24:
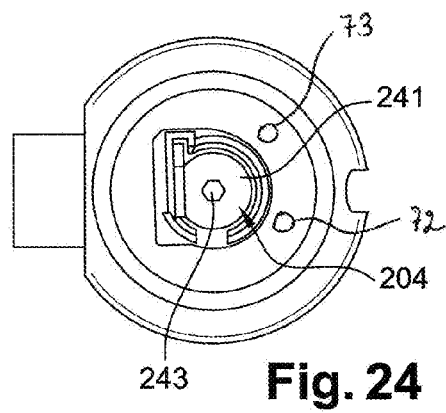
Figure 25:
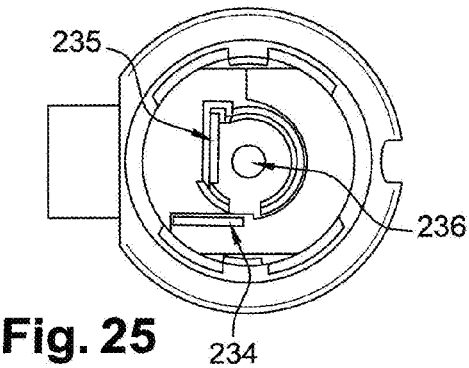
Figure 26:
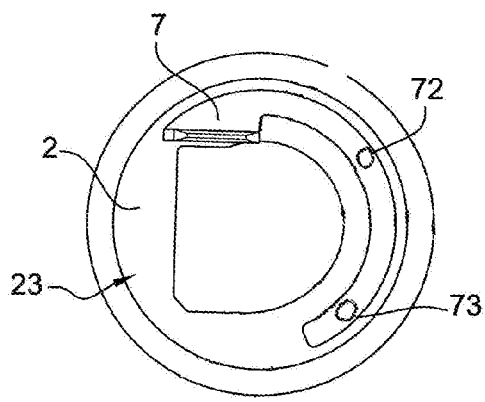

FIG. 21 shows a third power socket 210. The socket body 2 is again identical, and this power socket 210 has the main particular feature of including the negative tongue 7 that is fixed to the socket body 2 by the fixing points 72 and 73, as can be seen in FIGS. 24 and 26. In this configuration, the points for fixing by clinching 72 and 73 are obtained by stamping of the plane back 23 of the socket body 2 in support of the negative tongue 7. The base 203 includes the identical portion 31, but matches the negative tongue 7 and the positive tongue that is specific to it and its support 241, shown in FIG. 24. In particular, the rectangular openings 234 and 235 are perpendicular, like those of the first power socket 10, but are longer, as shown in FIG. 25, while there is a round central hole 236, unlike the support 141 of the second power socket 110.

The socket body 2 is therefore adapted to receive the three types of negative tongue elements, but only one at a time.

Figure 28:
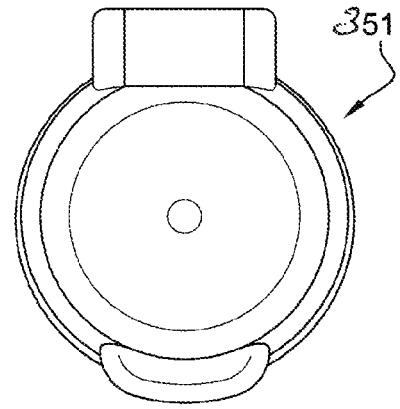
FIGS. 28 and 29 are top views of two caps of the aforementioned sockets.
Figure 29:
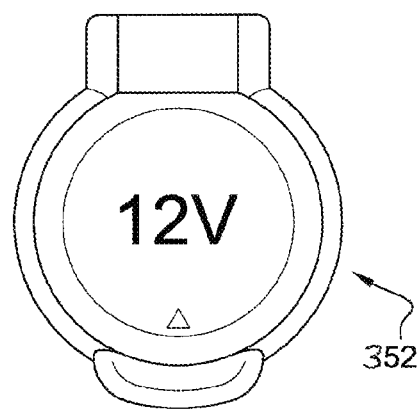

Finally, FIGS. 28 and 29 show two possible types of opening cap for the various sockets. The cap 351 shown in FIG. 28 is conventional while the cap 352 shown in FIG. 29 is chromium-plated and carries markings (for example "12 V").

These sockets can therefore be manufactured from an assembly comprising:
  identical sockets bodies 2; and
  first electrical connection elements or negative tongues 5, here of three types. The elements of each type are identical to one another and different from those of the other types. They correspond to the aforementioned sockets.

The assembly also comprises bases 3 adapted to be fixed to the socket body 2. Here the bases 3 are also of three types that differ from one another but include an identical portion 31.

The assembly further comprises three different types of second electrical connection elements or positive tongues 4.

It finally comprises two different types of caps for closing a housing of the power socket, for example.

For the manufacture of a power socket, such an assembly is procured and one of the negative tongues 5, 6 or 7 is fixed to the socket body 2. One of the positive tongues is also added, plus a base and a cap.

This assembly therefore makes it possible to manufacture three different types of power sockets and therefore to obtain an assembly that here comprises three different socket types. Here each power socket comprises five components in total.

Of course, numerous modifications could be made to the invention without departing from the scope thereof.

The number of positive tongues or negative tongues that are different, the number of bases and the number of caps in the assembly could be modified.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A power socket for a vehicle passenger compartment, comprising:
    at least one base;
    a socket body adapted to be received in said at least one base; and
    a plurality of electrical connection elements fixed to said socket body by clinching;
    said socket body comprising a plurality of attachment holds at a region thereof, with each of said plurality of electrical connection elements being adapted to be fixed to at least one predetermined attachment hold of said plurality of attachment holds such that the other of said plurality of electrical connection elements cannot then be fixed to said at least one predetermined attachment hold corresponding to the other of said plurality of electrical connection elements.

2. The power socket according to claim 1, in which said base has a raised pattern projecting from a back of said base so as to form an abutment in said power socket upon receiving a connector.

3. The power socket according to claim 1, in which each of said plurality of electrical connection elements being a first electrical connection element, said power socket furthermore comprises at least one second electrical connection element.

4. The power socket according to claim 1, in which said socket body comprises an opening emerging onto a receptacle intended to receive a connector for an electrical power supply of an electrical device.

5. The power socket according to claim 4, in which each of said plurality of electrical connection elements comprises a plane support and a tongue projecting from said plane support.

6. The power socket according to claim 4, in which each of said plurality of electrical connection elements being a first electrical connection element, said power socket furthermore comprises at least one second electrical connection element.

7. The power socket according to claim 4, in which each of said plurality of electrical connection elements is fixed to said socket body by clinching at the level of at least one fixing point.

8. The power socket according to claim 4, in which said socket body comprises at least one plane back opposite to said opening of said receptacle.

9. The power socket according to claim 8, in which said at least one plane back of said socket body comprises at least one main emergent hole.

10. The power socket according to claim 8, in which each of said plurality of electrical connection elements is fixed to said socket body by clinching at the level of at least one fixing point.

11. The power socket according to claim 1, in which each of said plurality of electrical connection elements comprises a plane support and a tongue projecting from said plane support.

12. The power socket according to claim 11, in which said plane support is fixed to at least one plane back of said socket body by clinching.

13. The power socket according to claim 1, in which each of said plurality of electrical connection elements is fixed to said socket body by clinching at the level of at least one fixing point.

14. The power socket according to claim 13, in which said at least one fixing point is a twin fixing point.

15. A method of manufacture of a power socket for a vehicle passenger compartment, comprising a socket body; and a plurality of electrical connection elements, each of said plurality of electrical connection elements being fixed to said socket body according to the following steps:
    placing each of said plurality of electrical connection elements and said socket body in contact; said socket body comprising a plurality of attachment holds at a region thereof; and
    fixing each of said plurality of electrical connection elements to at least one predetermined attachment hold of said plurality of attachment holds by clinching such that the other of said plurality of electrical connection elements cannot then be fixed to said at least one predetermined attachment hold corresponding to the other of said plurality of electrical connection elements.

16. The method of manufacture of a power socket for a vehicle passenger compartment according to claim 15, in which each of said plurality of electrical connection elements is stamped in said socket body.

17. The method of manufacture of a power socket for a vehicle passenger compartment according to claim 15, in which said socket body is stamped in each of said plurality of electrical connection elements.

18. The method of manufacture of a power socket for a vehicle passenger compartment according to claim 15, comprising a step of inserting said socket body into a base.

* * * * *